US010481766B2

(12) United States Patent
Cheung et al.

(10) Patent No.: US 10,481,766 B2
(45) Date of Patent: Nov. 19, 2019

(54) INTERFACES AND METHODS FOR GENERATING AND APPLYING ACTIONABLE TASK STRUCTURES

(71) Applicant: MICROSOFT TECHNOLOGY LICENSING, LLC, Redmond, WA (US)

(72) Inventors: Chairy Chiu Ying Cheung, Redmond, WA (US); Taurean Addair Jones, Issaquah, WA (US); Jose Ramon Calzada Gomez, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 15/430,346

(22) Filed: Feb. 10, 2017

(65) Prior Publication Data

US 2018/0232110 A1 Aug. 16, 2018

(51) Int. Cl.
| | | |
|---|---|---|
| *G06F 3/0482* | (2013.01) | |
| *G06F 16/338* | (2019.01) | |
| *G06F 16/332* | (2019.01) | |
| *G06F 16/33* | (2019.01) | |
| *G06F 17/27* | (2006.01) | |

(52) U.S. Cl.
CPC .......... *G06F 3/0482* (2013.01); *G06F 16/338* (2019.01); *G06F 16/3322* (2019.01); *G06F 16/3331* (2019.01); *G06F 17/2705* (2013.01)

(58) Field of Classification Search
CPC .. G06F 3/048–04897; G06F 2203/048–04809; G06F 17/30657; G06F 17/2705; G06F 17/3064; G06F 17/30696
See application file for complete search history.

(56) References Cited

U.S. PATENT DOCUMENTS

| | | | | | |
|---|---|---|---|---|---|
| 5,701,400 | A | * | 12/1997 | Amado | ............ G06N 5/02 706/45 |
| 5,963,939 | A | * | 10/1999 | McCann | ............ G06Q 30/06 |
| 6,026,388 | A | * | 2/2000 | Liddy | ............ G06F 16/3329 |
| 6,056,428 | A | * | 5/2000 | Devoino | ............ G06F 17/5009 703/2 |

(Continued)

FOREIGN PATENT DOCUMENTS

EP    2290562    3/2011

OTHER PUBLICATIONS

Rödiger et al., "RKWard: A Comprehensive Graphical User Interface and Integrated Development Environment for Statistical Analysis with R," Published on Jun. 30, 2012, https://www.jstatsoft.org/article/view/v049i09 (Year: 2012).*

(Continued)

*Primary Examiner* — Haoshian Shih
*Assistant Examiner* — Alvaro R Calderon, IV
(74) *Attorney, Agent, or Firm* — Workman Nydegger

(57) ABSTRACT

Actionable task structures comprised of a plurality of tasks are generated by systems and methods utilizing interfaces that suggest tasks for assembly into the actionable task structures based on contextual relevance to data set attributes, other tasks in the actionable task structures and user annotations. The Actionable task structures are stored and selectively applied to one or more different domains for transformation data in the corresponding data sets.

19 Claims, 9 Drawing Sheets

(56) References Cited

U.S. PATENT DOCUMENTS

| | | | |
|---|---|---|---|
| 6,381,580 B1 | 4/2002 | Levinson | |
| 6,633,885 B1 | 10/2003 | Agrawal et al. | |
| 6,795,868 B1 | 9/2004 | Dingman et al. | |
| 6,836,773 B2* | 12/2004 | Tamayo | G06F 16/951 |
| 6,915,308 B1* | 7/2005 | Evans | G06F 16/903 |
| | | | 707/754 |
| 7,039,865 B1 | 5/2006 | Hersh | |
| 7,168,035 B1* | 1/2007 | Bell | G06F 17/2247 |
| | | | 715/234 |
| 7,225,199 B1* | 5/2007 | Green | G06F 17/2785 |
| 7,305,614 B2 | 12/2007 | Chen et al. | |
| 7,461,059 B2* | 12/2008 | Richardson | G06F 17/28 |
| 7,640,254 B2 | 12/2009 | McConnell | |
| 7,873,153 B2* | 1/2011 | Bukovec | G06Q 10/06 |
| | | | 379/220.01 |
| 8,170,897 B1 | 5/2012 | Cohen et al. | |
| 8,195,641 B2 | 6/2012 | Rucker et al. | |
| 8,438,177 B2 | 5/2013 | Paulsen et al. | |
| 8,447,775 B2 | 5/2013 | Vronay et al. | |
| 9,424,068 B2* | 8/2016 | Lin | G06F 9/46 |
| 9,767,201 B2* | 9/2017 | Pantel | G06F 16/9535 |
| 9,934,306 B2* | 4/2018 | Subramanian | G06F 16/3338 |
| 2003/0040850 A1* | 2/2003 | Najmi | G06F 3/0482 |
| | | | 701/1 |
| 2004/0230572 A1* | 11/2004 | Omoigui | G06F 16/24575 |
| 2005/0102284 A1 | 5/2005 | Srinivasan et al. | |
| 2005/0288920 A1* | 12/2005 | Green | G06F 17/2785 |
| | | | 704/3 |
| 2005/0289168 A1* | 12/2005 | Green | G06F 16/951 |
| 2006/0136280 A1* | 6/2006 | Cho | G06Q 10/06 |
| | | | 705/7.13 |
| 2009/0106684 A1 | 4/2009 | Chakra et al. | |
| 2009/0150388 A1* | 6/2009 | Roseman | G06F 17/278 |
| 2009/0171720 A1* | 7/2009 | Crook | G06Q 10/04 |
| | | | 705/35 |
| 2011/0320433 A1 | 12/2011 | Mohiuddin et al. | |
| 2012/0059842 A1* | 3/2012 | Hille-Doering | G06F 16/3322 |
| | | | 707/769 |
| 2012/0265779 A1* | 10/2012 | Hsu | G06F 16/3322 |
| | | | 707/767 |
| 2013/0006689 A1 | 1/2013 | Kinnear et al. | |
| 2013/0275429 A1* | 10/2013 | York | G06Q 50/01 |
| | | | 707/737 |
| 2014/0282188 A1* | 9/2014 | Hathaway | G06F 8/34 |
| | | | 715/771 |
| 2015/0324346 A1* | 11/2015 | Sankaran | G06F 16/2456 |
| | | | 715/212 |
| 2016/0055205 A1 | 2/2016 | Jonathan et al. | |
| 2016/0092475 A1* | 3/2016 | Stojanovic | G06F 16/211 |
| | | | 707/805 |
| 2016/0224624 A1 | 8/2016 | Robichaud | |
| 2016/0231915 A1* | 8/2016 | Nhan | G06F 16/904 |
| 2016/0364382 A1* | 12/2016 | Sarikaya | G06F 16/3322 |
| 2016/0371288 A1* | 12/2016 | Le Biannic | G06F 16/90328 |
| 2016/0371395 A1* | 12/2016 | Dumant | G06F 16/90328 |
| 2017/0090893 A1 | 3/2017 | Aditya et al. | |
| 2017/0315796 A1 | 11/2017 | Melnik et al. | |
| 2017/0364568 A1* | 12/2017 | Reynolds | G06F 3/0482 |
| 2017/0371881 A1* | 12/2017 | Reynolds | G06F 9/54 |
| 2018/0074786 A1* | 3/2018 | Oberbreckling | G06F 7/02 |
| 2018/0075104 A1* | 3/2018 | Oberbreckling | G06F 16/254 |
| 2018/0075115 A1* | 3/2018 | Murray | G06F 16/2456 |
| 2018/0129369 A1 | 5/2018 | Kim et al. | |
| 2018/0165604 A1* | 6/2018 | Minkin | G06Q 10/06 |
| 2018/0210936 A1* | 7/2018 | Reynolds | G06F 16/215 |
| 2018/0233141 A1* | 8/2018 | Solomon | G06N 20/00 |
| 2018/0246896 A1* | 8/2018 | Bailey | G06F 16/3329 |
| 2018/0314751 A1 | 11/2018 | Filippi et al. | |

OTHER PUBLICATIONS

Maglio et al., 2000, "Intermediaries personalize information streams," Commun. ACM 43, 8 (Aug. 2000), 96-101. DOI=http://dx.doi.org/10.1145/345124.345158 (Year: 2000).*

U.S. Appl. No. 15/430,358, filed Feb. 10, 2017, Jones et al.

U.S. Appl. No. 15/430,369, filed Feb. 10, 2017, Gomez et al.

"Relational Query Designer User Interface (Report Builder)", Retrieved on: Aug. 16, 2016 Available at: https://msdn.microsoft.com/en-us/library/dd220607.aspx.

Schweickert, et al., "A Graphical User Interface to the Object-Oriented Database System Vodak on the Basis of the Generic Visualisation Toolkit Lyberworld", In Proceedings of the 3rd International Workshop on Interfaces to Databases, Jul. 8, 1996, 12 pages.

"Non Final Office Action Issued in U.S. Appl. No. 15/430,358", dated Mar. 1, 2019, 25 Pages.

"Non Final Office Action Issued in U.S. Appl. No. 15/430,369", dated Mar. 8, 2019, 23 Pages.

"Final Office Action Issued in U.S. Appl. No. 15/430,358", dated Jul. 15, 2019, 17 Pages.

* cited by examiner

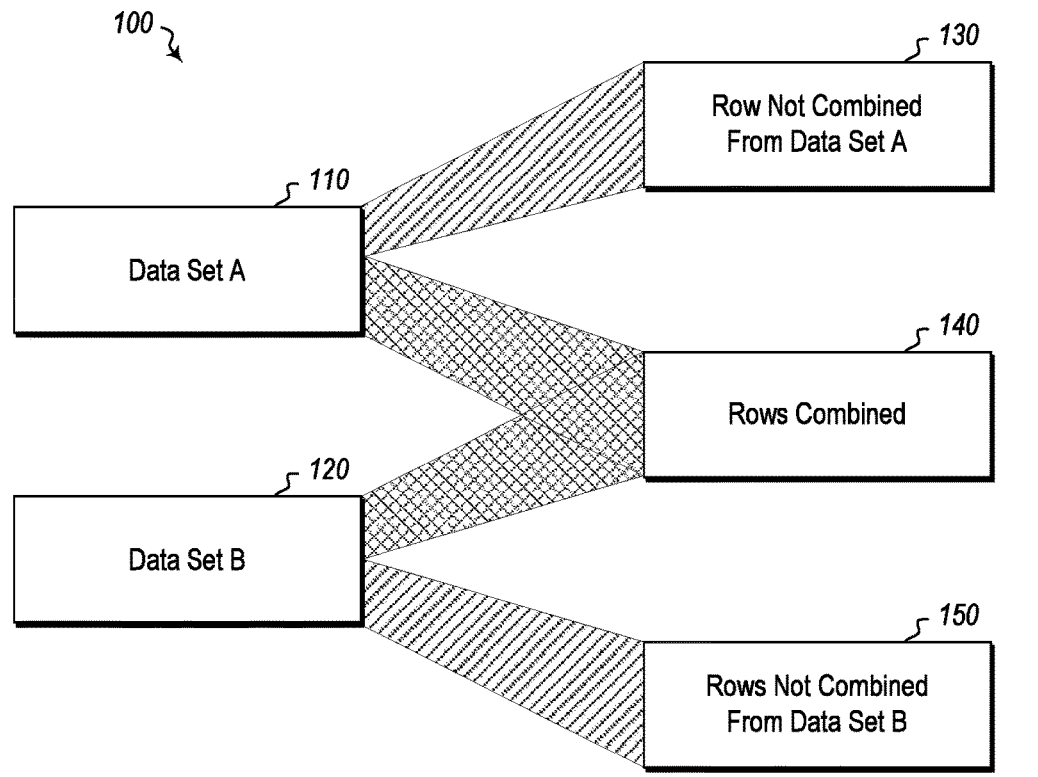
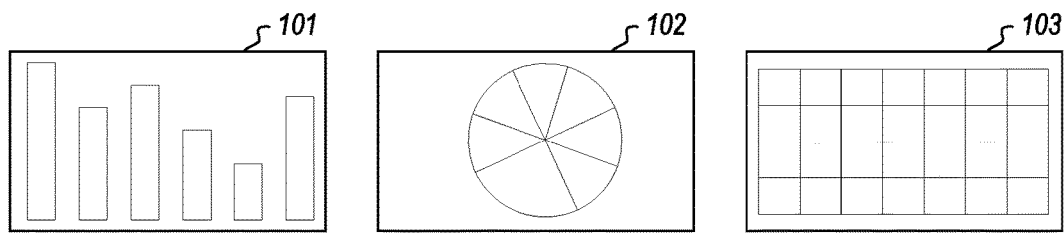
Figure 2A

Key Term Index 410

| Task Name/Identifier 412 | Symantic Terms 414 | Syntactic Terms 416 |
|---|---|---|
| ～～～ | ～～～ | ～～～ |
| ～～～ | ～～～ | ～～～ |
| ～～～ | ～～～ | ～～～ |
| ～～～ | ～～～ | ～～～ |

Data Set Attribute Index 420

| Type 422 | Dependencies 424 |
|---|---|
| ～～～ | ～～～ |
| ～～～ | ～～～ |
| ～～～ | ～～～ |
| ～～～ | ～～～ |

Transform Dictionary 430

| Task Name/Type 432 | Effect Terms 434 | Inputs 436 | Outputs 438 | Transform Code/Pointer 440 | Dependency 442 | Priority 444 |
|---|---|---|---|---|---|---|
| ～～ | ～～ | ～～ | ～～ | ～～ | ～～ | ～～ |
| ～～ | ～～ | ～～ | ～～ | ～～ | ～～ | ～～ |
| ～～ | ～～ | ～～ | ～～ | ～～ | ～～ | ～～ |
| ～～ | ～～ | ～～ | ～～ | ～～ | ～～ | ～～ |

| Task1 | Effect | Input(s) | Output(s) | Transform Code/Pointer | Dependency | Priority |
|---|---|---|---|---|---|---|
| Task2 | Effect | Input(s) | Output(s) | Transform Code/Pointer | Dependency | Priority |
| Task3 | Effect | Input(s) | Output(s) | Transform Code/Pointer | Dependency | Priority |

*Figure 4D*

INTERFACES AND METHODS FOR GENERATING AND APPLYING ACTIONABLE TASK STRUCTURES

CROSS-REFERENCE TO RELATED APPLICATIONS

This application is related to U.S. patent application Ser. No. 15/430,358 filed on Feb. 10, 2017, entitled "RESEQUENCING ACTIONABLE TASK STRUCTURES FOR TRANSFORMING DATA," and U.S. patent application Ser. No. 15/430,369 filed on Feb. 10, 2017, entitled "APPLICATION OF ACTIONABLE TASK STRUCTURES TO DISPARATE DATA SETS FOR TRANSFORMING DATA IN THE DISPARATE DATA SETS," both of which applications are incorporated herein by reference in their entirety.

BACKGROUND

Many data management interfaces and tools have been developed to help data scientists analyze data sets. For instance, graphing tools can be used to visually represent relative magnitudes of data stored in tabular form.

Some data sets are very complex and are stored in disparate formats and locations. Sometimes, due to human error, the data has also been entered incorrectly or inconsistently. These complexities and inconsistencies can make it difficult to intuitively process and understand the correlations that exist between the underlying data. Accordingly, it is sometimes necessary to transform the data into a more unified and comprehensible form before it can be properly analyzed.

Data scientists transform the data with discrete tasks. These tasks, which are also referred to as transforms, can include simple algorithms such as multiplication or addition. Other tasks are more complicated. For instance, some tasks are used to parse complex strings of data or to split, normalize, merge, reformat or perform other complex transformations on the data.

It is common for data scientists to apply a plurality of tasks to complex data sets before the underlying data is ultimately transformed into the desired form for final analysis. However, it can be a difficult and time consuming process to identify the appropriate tasks to be applied to the data, as well as to identify the specific order for applying desired tasks. In particular, the data scientists may not be familiar with all of the different transforms that are available for use with their data management software. Sometimes, it can also be difficult to know how one task might negatively impact another task in a transformation pipeline.

For instance, by way of example, if a data scientist is trying to merge two tables having similar data, but the data in corresponding columns is not in the exact same format (e.g., addresses being presented in different formats), the scientist might invoke a normalization transform to facilitate the merge. However, this normalization could have an unintended consequence of reducing the data to a lowest common denominator (e.g., a format that eliminates the zip code for some of the addresses, if other addresses are already missing a zip code). As a result of this process, certain content might be omitted that would otherwise be required to perform a subsequent task, such as a task for graphing sales associated with the different addresses on a region granularity (e.g., based on zip code).

The foregoing example is only a simple illustration of how one task might have an undesired consequence on another task. Other examples include changing data from one type to another type that may not be compatible (e.g., changing dates to percentages or strings to integers) and which may render the data incomprehensible for subsequent processes.

For very complex data sets, data scientists are often required to iteratively apply different tasks in different combinations to determine whether each task and combination of tasks is appropriate and/or compatible. It will be appreciated, that this iteration can consume significant amounts of time and computer processing. This waste in computing resources is even more pronounced when considering that it is often necessary to redundantly perform the same processes for designing the same or similar sequences of tasks to be applied to different domains, e.g., to different data sets or through different applications.

Accordingly, there continues to be an ongoing need for improved systems and tools for facilitating the identification and application of tasks to be used for performing desired transformations on data sets.

BRIEF SUMMARY

The disclosed embodiments include methods, systems and computer program products for facilitating the generation of actionable task structures and for applying the actionable task structures to one or more data sets.

In some embodiments, unique interfaces are provided for facilitating the identification of discrete data transforms, in the form of tasks and task sequences, for user selection and for facilitating the assembly and storage of the actionable task structures for concurrent or subsequent application to one or more data sets. The tasks and task sequences are discovered and surfaced by the interfaces, based at least in part on a context of the underlying data, one or more other tasks that are already included in the actionable task structures and/or user annotations.

Some of the disclosed embodiments for generating the actionable task structure include acts of identifying a data set having the one or more particular attributes, rendering one or more visualization associated with the data set and receiving user input for triggering a display of a user interface that includes an annotation field configured to receive textual user input and a task suggestion field for displaying identifiers for a set of one or more suggested tasks that are selectable by user input for inclusion into the actionable task structure. Each task in the task suggestion field is associated with a data transform and metadata that defines corresponding attributes of data that the data transform applies to.

The generation of the actionable task structure also includes, in some instances, receiving the textual user input in the annotation field and identifying the set of one or more suggested tasks based at least in part on a correlation between the one or more particular attributes of the data, the metadata of the one or more suggested tasks, and the textual user input.

In some instances, the identifiers for the one or more suggested tasks are displayed in the task suggestion field and input is received for selecting one or more of the suggested tasks identified in the task suggestion field. Then, each selected task is added to the actionable task structure. The actionable task structure is then stored as an assembly of a plurality of selected tasks, which enables the actionable task structure to be accessed and applied at any time to one or more data sets.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only exemplary embodiments and are not therefore to be considered to be limiting in scope, embodiments will be described and explained with additional specificity and detail through the use of the accompanying drawings in which:

FIGS. 1A-2B illustrate examples of data visualizations.

FIG. 4A illustrates a key term index data structure that is used to index task names or other identifiers with semantic terms and/or syntactic terms associated with the tasks.

FIG. 4B illustrates a data set attribute index data structure that is used to index types and dependency attributes of identified data sets.

FIG. 4C illustrates a transform dictionary data structure that is used to index task attributes.

FIG. 4D illustrates an actionable task structure comprising a plurality of different tasks that are saved as a single assembly.

DETAILED DESCRIPTION

Figure 1A:
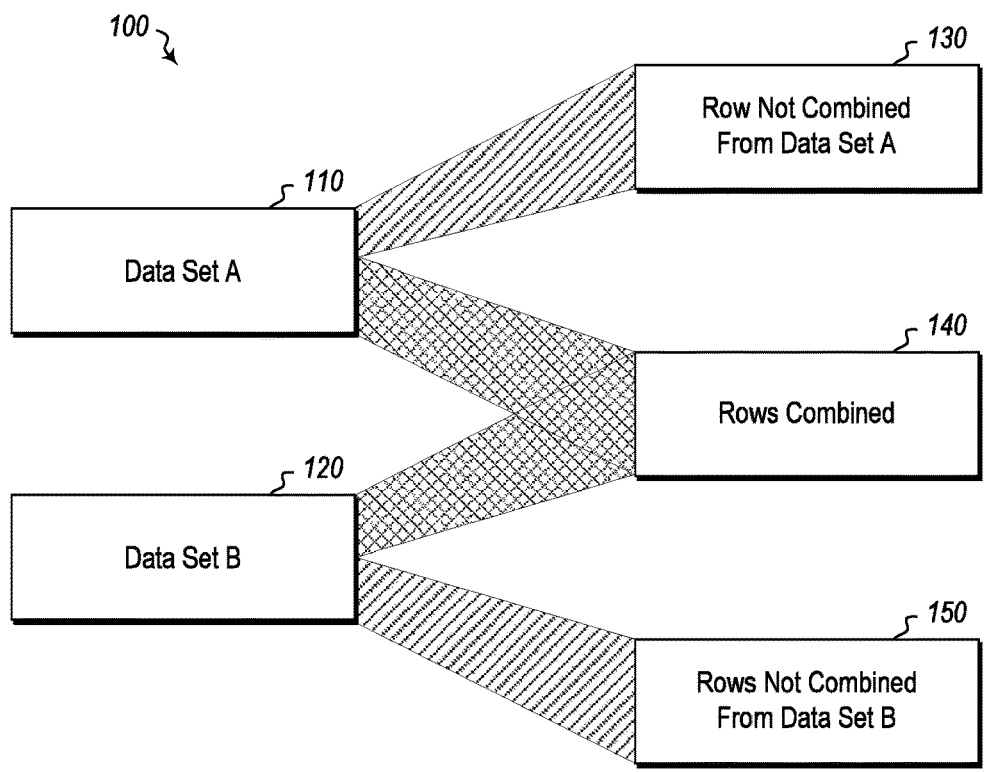

The disclosed embodiments include methods, systems and computer program products for facilitating the generation and application of actionable task structures that comprise composed assemblies of discrete tasks that define data transforms to be applied to one or more data sets.

In some embodiments, unique interfaces are used to help facilitate the assembly of the actionable task structures, which are stored for concurrent and/or subsequent application to one or more data sets in one or more different domains. The tasks and task sequences are discovered and surfaced through the interfaces, based at least in part on context, and even more particularly, based on a correlation between attributes of the suggested tasks, attributes of the underlying data, attributes of one or more other tasks that are already included in the actionable task structures and/or user annotations.

The unique interfaces of the disclosed embodiments provide features for helping to reduce the overall resources (including time and computer processes) required to build a transformation pipeline (referred to herein as an actionable task structure) that includes an assembled of plurality of tasks for transforming data. Even more particularly, the disclosed embodiments can help improve the efficiencies for identifying and assembling a plurality of individual tasks, which each correspond to a different data transform, into a sequenced data structure composition that is stored and made accessible from and/or applied to one or more different domains (e.g., different sessions, different data sets, through different applications and/or different instances of a single application).

Often when a user is analyzing a large data set, the type of changes necessary to prepare the data for downstream consumption can seem overwhelming, not obvious, and/or difficult to implement. The technical challenges in transforming data in large data sets are sometimes magnified because there is simply too much information, or data, for a user to review. As described in the background, it can be difficult to identify and sequence the necessary transformations for modifying data into a desired format for analysis. Some of the disclosed embodiments allow the user (for example, a business user with limited technical skills for manipulating data) to recognize and implement data modifications that should occur based on their limited knowledge and without having to have the technical skills to implement the changes on their own.

The disclosed embodiments can help provide technical advantages in the area of data analytics, as well as other related fields, such as data processing and data storage, by providing interfaces that can be used to reduce the amount of tinkering and computer processing that would otherwise be required to identify relevant and compatible transforms that are appropriate for manipulating the data into the desired format and that would be required to assemble these transforms into an assembled and storable data structure. These and other advantages will become more apparent through the rest of this disclosure.

Attention will now be directed to FIGS. 1A-2B, which illustrate some non-limiting examples of visualizations that can be used by data scientists to analyze data and/or to help make decisions about the data transformations that might be necessary to put the data into a desired form for comparable analytics, such as in a learn-as-you go methodology (e.g., make a transform, graph the transformed data and repeat the processes until the data is in the desired final form). In this regard, it will be appreciated that the visualizations represented in FIGS. 1A-2B, as well as other data visualizations, can be utilized to represent correlations between the underlying data at different phases of data analysis. Accordingly, the scope of the disclosed embodiments is not limited by the types of data visualizations that are used nor the timing for rendering the visualizations during the disclosed processes for assembling and/or applying the actionable task structures. In fact, some embodiments include rendering these or other visualizations concurrently with the other interfaces that are described herein.

FIG. 1A illustrates a Sankey-type diagram, which is currently reflecting an example visualization of two data sets that are being joined with a SQL type join or other joining operation. For instance, in this example, data set A 110 and data set B 120 are shown as being combined. In this diagram, there are three streams flowing from the two data sets. The first stream 130 indicates rows from data set A 110 that did not combine with rows in data set B 120. The second stream 140 indicates rows that were joined between data set A 110 and data set B 120. The third stream 150 indicates rows from data set B that did not join to rows in data set B 120.

Figure 1B:
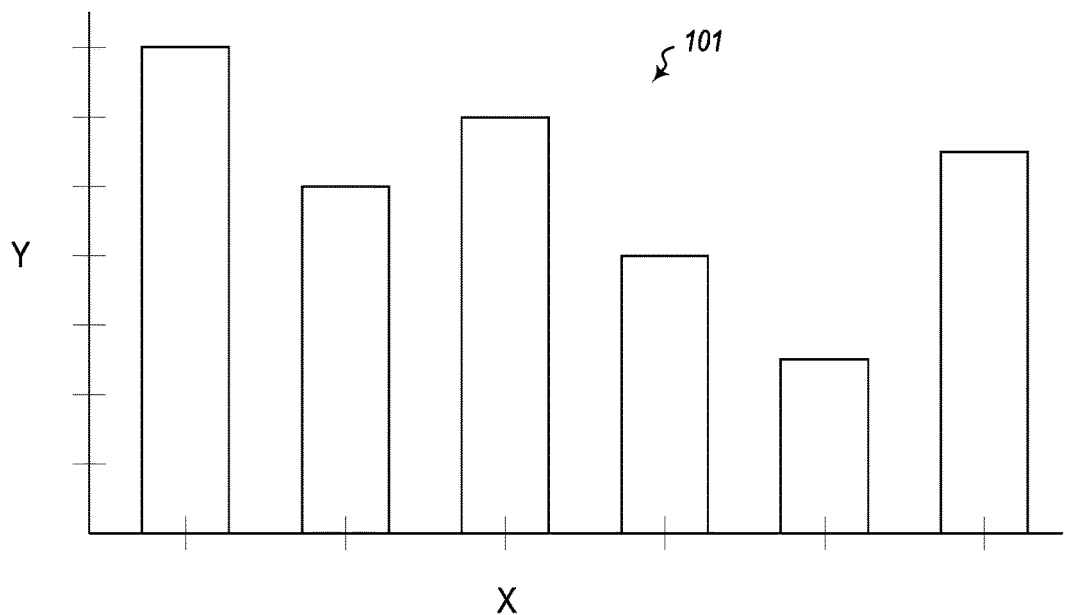

FIG. 1B provides an alternative example of an abstraction of a visualization that may be associated with a data set. In this example, bar chart 101 represents counts for items in a normalized set of data and how many times a value is associated to a record. For example, if the data set is tracking news events based on company name, the x-axis will track the unique companies and the y-axis will track how many times a company has been referenced.

FIG. 2A provides an alternative visualization example where multiple data visualizations are provided in a single view. Each visualization is based on the same data set, but draws attention to different aspects of the data. For example, a user can alternate between a Sankey diagram 100 and Bar chart 101, within a single interface display, to identify possible data transformations operations to conduct. For example, Data set A 110 lists news events for a group of companies. Data set B 120 is a normalized list of those same companies with additional company information. Based on this visualization model, the user can investigate why all the rows in data set A 110 did not join properly with rows in data set B 120.

In this scenario, the user expected each row from data set A 110 to have a match in data set B 120 because it is a normalized list of values commonly referenced in data set A 110. To illustrate this, a data set that includes a company name can refer to that company in more than one way even though each entry refers to the same company. As an example, the same company may be listed as Microsoft, MSFT, and MS in different records of data set A 110, yet data set B 120 may only have one of these values. In such a case, only the matching values will properly match. To increase correlation, a user might apply a transformation for normalizing the company name throughout the data set to increase the number of combined rows. When such a transformation is applied, the resulting effect will be represented in both the Sankey diagram and the Bar chart. For instance, in the Sankey diagram, the size of the first stream 130 would reduce proportionally to the number of normalized records. In the Bar chart, the column associated to Microsoft would increase proportionally to the number of normalized records. Additionally, or alternatively, the data visualization could be represented as a Pie chart 102 or a table 103 of data records.

Despite the specificity of the foregoing examples, it will be appreciated that additional data visualizations can also be used, including Pareto charts, relationship diagrams, database join diagrams, or any other data visualizations, which may be rendered with the actionable task structure user interfaces that are used for generating and applying the actionable task structures to the identified data sets being visualized.

Figure 2B:
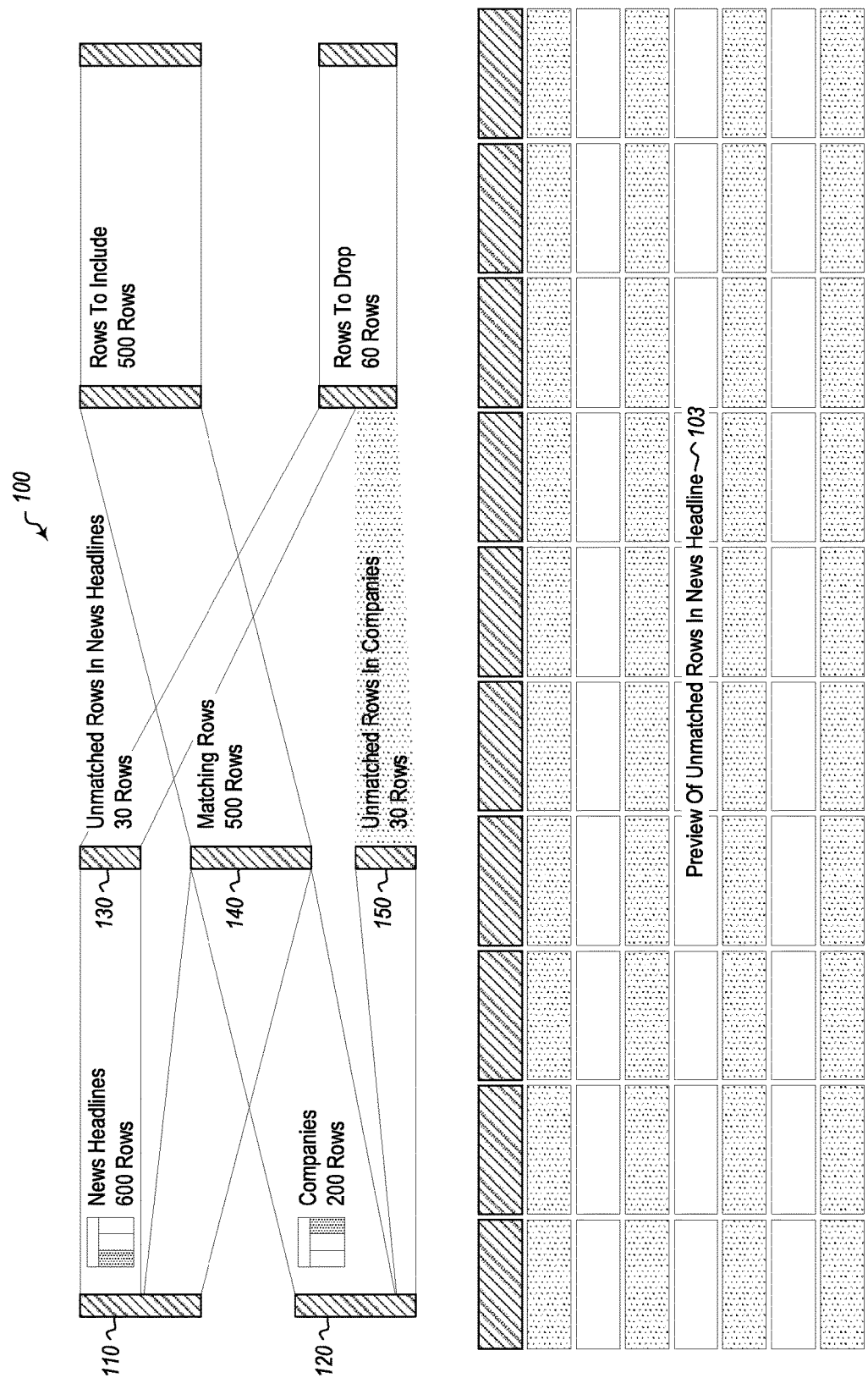

FIG. 2B provides an alternative illustration of an interface that includes multiple data visualizations in a single view and which can help a user understand the transformation effects on the data set. Here, a Sankey diagram 100 is combined with a table 103 of data records in a selected result set. For example, the table 103 lists data records from the first data stream 130 so that a user can visually inspect the data values within the table 103 that may help the user to identify data transformations that will enable more records to be joined between the data sets.

While data visualizations can be useful, for simplifying a set of data into a single view, users often need to modify data in the one or more data sets to obtain the desired transformation(s) and resultant transformed data set and/or visualization. In some cases, the data changes may only be a few records, but often, there will be many data records that need to be modified. In such a case, the ability to make the change(s) to the data often requires technical skills to transform the data; technical skills that many users may not necessarily have. Disclosed embodiments, described herein, help to address this problem by providing interfaces that are configured to identify and suggest transformations to make to the data sets that are contextually relevant and that can help the user obtain a desired result, as described in more detail below.

Actionable Task Structure Interfaces

Figure 3A:
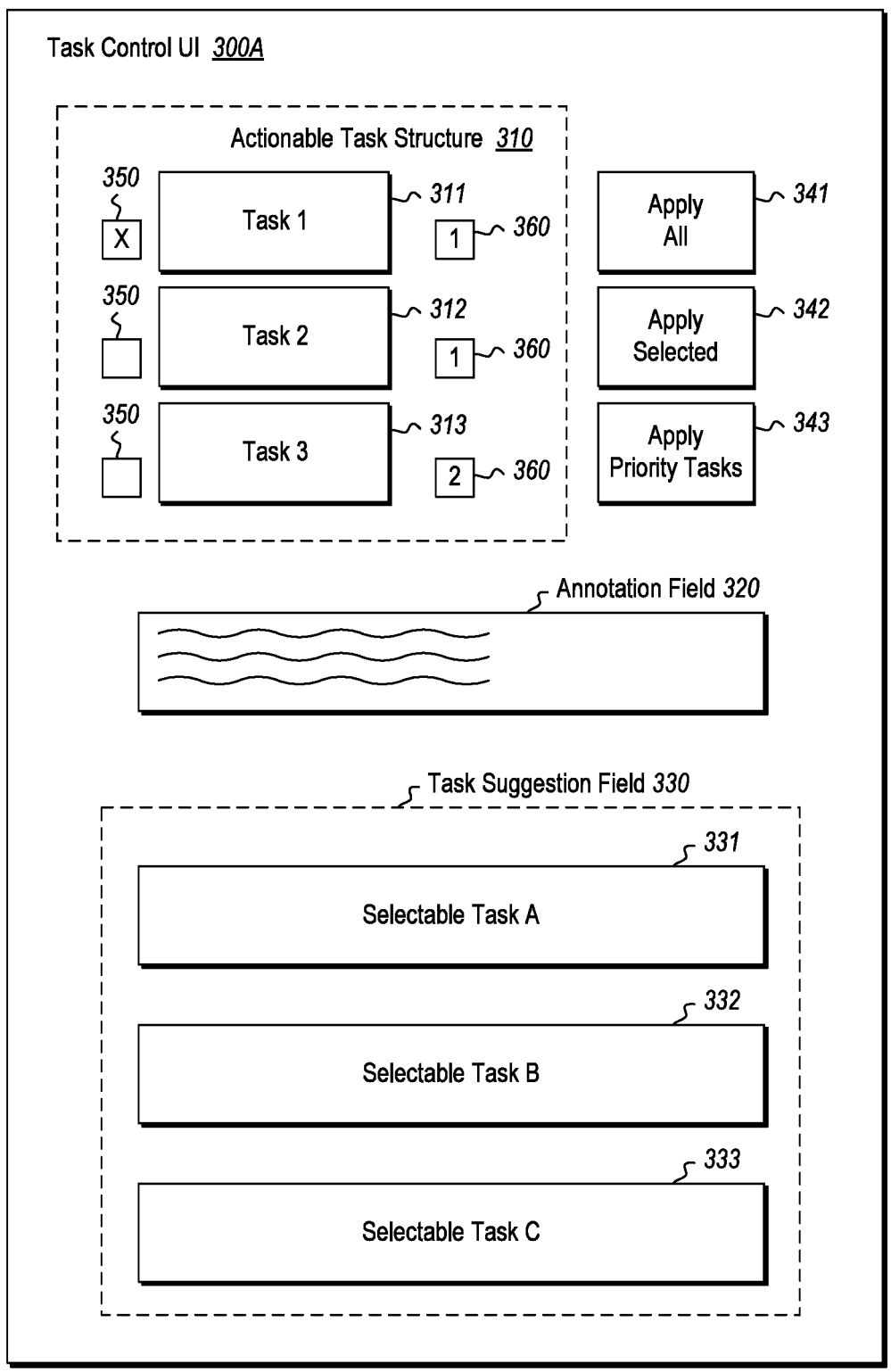
FIG. 3A illustrates a user interface that is sometimes referred to, herein, as a task control user interface or an actionable task structure user interface. This user interface includes a visualization of an assembled actionable task structure, an annotation field for receiving user input and a task suggestion field that displays suggested tasks to add to the actionable task structure. Controls are also provided in the interface for selectably applying tasks from the actionable task structure, collectively and/or individually.

FIG. 3A provides an exemplary task assembly structure user interface (hereinafter 'interface' or 'task control UI') 300A that is usable to generate an actionable task structure comprised of a plurality of separate transforms ('tasks') that are assembled into a single task structure. Each task in the structure comprises code defining a data transform in the form of computer executable code for performing a data transformation operation that is executable on data in a data set. In some instances, the code for each task is contained in the actionable task structure. In other instances, some or all of the transformation code is stored in other structures that are referenced by pointers in the actionable task structure. Specific examples of the form and attributes of the actionable task structure and the corresponding tasks will be provided later. For instance, an example of an actionable task structure is represented in FIG. 4D, while a related transform dictionary that indexes and identifies the different attributes of tasks that are available for assembly into the actionable task structures is represented in FIG. 4C.

Returning to FIG. 3A, the task control UI 300A can be instantiated or launched from a data management/manipulation application that is operable to perform transformations on data in a defined data set. Such a data set may include data from one or more storage locations and may be composed of data in one or more different formats. In this regard, it will be appreciated that the data need not be tabular or structured data and can comprise any combination of structured and/or unstructured data.

In some instances, the data management application has already been used to identify the scope or range of the data set for which the data transformations will be applicable including any combination of structured and unstructured data (e.g., by identifying the tables, files or data structures that are part of the data set). The task control UI 300A is operable, in some instances, to facilitate the selection of tasks to be applied to the data set to perform the desired transformations. For instance, while not shown, the UI 300A may include a selectable control which, when selected, provides the user with options for defining or selecting the scope of the data set.

In other embodiments, the UI 300A is instantiated by a user selecting particular data to be analyzed from a menu or other option in a data management software platform.

Once instantiated, the task control UI 300A will present an actionable task structure 310 and/or be used to generate/assemble the actionable task structure 310 to be used for transforming the identified data.

The actionable task structure shown in FIG. 3A currently illustrates three tasks 311, 312, 313, which collectively form the actionable task structure. Although only three tasks are shown in the present illustration, it will be appreciated that the actionable task structure 310 may include more or less than three tasks, depending on how many tasks have been selected by a user for inclusion into the actionable task structure 310.

Each illustrated task in the actionable task structure 310 is associated with data transform/operation that is executable on data in the data set to transform the data, or on a model of the data to transform the model of the data. It will be appreciated that the term transform should be broadly construed to apply to any transforming operation that can be applied to data, including altering a format or type of the data, performing a mathematical algorithm on the data, splitting the data, merging the data, normalizing the data, simplifying the data, tagging or annotating the data, moving the data, compressing the data, or any other data transformation that can be applied to the data.

Some non-limiting examples of specific tasks associated with these transforms include are join operations, normalization operations, truncation operations, rounding operations, and so forth.

In some instances, the actionable task structure defines a particular sequence for performing the assembled tasks in the actionable task structure. This sequence or order for executing the assembled tasks is controllable, for instance, based on the ordering in which the tasks are assembled or listed, or by a predetermined priority scheme and priority attributes set for the different tasks. In other instances, the sequence is controlled by an order of dependency relationships that are defined by attributes associated with the tasks. Combinations of the foregoing sequencing schemes can also be used to control the order in which the tasks in the assembled actionable task structure are executed.

In some instances, the tasks which are added to the actionable task structure 310, shown in the task control UI 300A, are selected by a user from a listing of suggested tasks. The listing of suggested tasks, which will be described later on, includes tasks identified, at least partly, in response to the suggested tasks having task attributes which semantically or syntactically match or correlate with (1) the data set attributes of the data in the identified data set, (2) task attributes and/or dependencies for other tasks in the actionable task structure 310 and/or (3) terms parsed form the textual input provided into annotation field 320, as described in more detail below.

Once the actionable task structure 310 is assembled, it is saved so that it can be accessed at a later time, such as to be modified and/or applied to one or more data sets in one or more different domains. The actionable task structure 310 can be saved automatically, as it is assembled and modified and/or in response to explicit save instructions based on user input received at the task control UI 300A or when the actionable task structure 310 is rendered in another interface (e.g., via save commands, selection of save menu controls or icons (not shown), and so forth).

Attention will now be directed to the annotation field 320, which is configured to receive input from a user. The annotation field 320 is illustrated in FIG. 3A with wavy lines that abstractly represent text entered by a user. The user input is a textual input that is entered through a physical keyboard, a display screen interface keyboard, voice-to-text interface or any other interface that is capable of entering text into the annotation field 320. In some instances, the user input is selected and/or entered through a drag-and-drop menu or other interface where the user selects suggested actions or elements for inclusion into the annotation field 320.

Terms, tuples, strings and other characters entered into the annotation field 320 are used to reference a key term index 410 (FIG. 4), to search for and identify one or more tasks having attributes that match or that are otherwise associated with the terms parsed from the textual user input. Key term index 410 and other data structures that are used to store task attributes (as well as data set attributes) are made accessible to the task control UI 300A to determine correlations between textual input, the task attributes and/or the data set attributes.

FIGS. 4A-4C illustrate some of the different data structures that may be used to index and correlate similarities between the text entered into the annotation field with attributes of different tasks as well as to index and correlate similarities between data set attributes and the attributes of the tasks. In FIG. 4A, for instance, a key term index 410 is provided with different fields that correlate task names or other identifiers 412 with (1) certain semantic terms and/or tuples 414 and/or (2) syntactic terms and/or tuples 416 associated with each of the indexed tasks in the key term index 410.

When input is entered into the annotation input field 320, a parser parses the terms and/or tuples from the textual input and references the key term index for any matching terms/tuples in the semantic and/or syntactic term fields (414, 416). When a match occurs, the corresponding task is identified as a suggested task to be presented to the user within the task suggestion field 330 of the task control UI 300A.

A data attribute analyzer also examines the identified data set to identify attributes of the data set, wherein the identified data set may have any size/granularity (e.g., database, file, column, row, field, term, page, worksheet, etc.)

The data set attributes include types, formats and dependencies of data contained within different data fields (of structured data sets). The data attribute analyzer may also perform parsing of unstructured data sets to identify similar attributes of the underlying data in the unstructured data sets.

The data set attributes include data types and data dependencies. The data types includes types, formats and classes of data in the identified data set. The data dependencies reference other data fields or variables that depend from a particular data item or that the particular data item depends from. The types and dependencies can be indexed by particular data items (e.g., data locations or data names, by adding a separate column and fields for correlating the data items to the data set attributes, not shown). Alternatively, the data set attributes for a defined data set can be indexed with less granularity, and more generality, by simply identifying the types and dependencies that are present in the data set, for comparison to task attributes identified in the transform dictionary 4C.

FIG. 4B illustrates an example of a data set attribute data structure 420 (with corresponding type 422 and dependency 424 attributes identified within the data set attribute data structure 420). The data set attributes, regardless of how they are stored, are referenced by the task control UI 300A or another system component to identify correlations between task attributes and the indexed data set attributes. When a correlation occurs, the related task is also added to the task suggestion field 330.

The illustration of the data set attribute data structure 420 is only a very simple and non-limiting example. Accordingly, it will be appreciated that the data set attribute data structure 420 may contain other formats for storing any type of data set attributes that are desired for consideration when determining contextual relevance of tasks to suggest to the user for the actionable task structure.

In some alternative embodiments, for example, the data set attribute data structure 420 has a different format and is configured to index annotation data that a user has tagged the data with during editing/annotating of the data set. Additionally, or alternatively, the data set attribute data structure 420 can be configured to identify variations of similar terms or data outliers that deviate in type or format from other data within a predetermined data set (e.g., detecting a single cell in a column that has a different type or formatting of the data relative to the other column cells). Spellchecking tools, grammer tools, and debugging tools/modules can be used to help find inconsistencies in the data types and formats, relative to other selected data and/or relative to separate or third party indexes.

Any data annotations or other attributes that are determined to be relevant (based on user settings) and that are identified by the data attribute analyzer are stored in the data set attribute index 420 for comparison to the task attributes in a transform dictionary. The stored data set attributes are then used, as described herein, to determine whether there is a sufficient correlation/contextual relationship to surface the corresponding tasks for presentation to the user in the task suggestion field 330.

The task attributes, referenced above, include any combination of the data that is indexed or otherwise referenced by the transform dictionary 430 (FIG. 4C). These task attributes form a part of the corresponding tasks and may include, for example, a task type/name 432, task effects 434 (semantic and syntactic effects/terms associated with the functionality of the task transform, which may include terms like add, remove, transform column, merge, normalize, transform row, remove, schema change, etc.), inputs 436 (which include input types expected by the task, such as a number, string, integer, character, etc.), outputs 438 (which include the type of output resulting from the transform, such as a number, string, integer, character, etc.), the transform code 440 (which may include the actual code and/or a pointer to the actual transform code), and dependency information 442 (specifying required tasks to be performed prior to or subsequent to the corresponding task), and priority level information 444 (specifying priority settings of the task).

In most instances, the entire contents of the task (including all of their attributes and code) will not be provided to the user in the task suggestion field 330. Instead, only a limited portion of the task will be provided for view and selection. For instance, the task suggestion field 330 might only list a selectable name or other identifier for the referenced task. Other attributes and components of the task (which may be surfaced through another interface such as interface 300B) are hidden from the user in the task suggestion field 330.

When a user selects the task identifier in the suggested task field 330, or otherwise provides input for selecting a referenced task, that task will be added to the actionable task structure 310. In other embodiments, selection of a task identifier will trigger the launch of another a related user interface (e.g., interface 300B described below in reference to FIG. 3B), which can be used to obtain additional information about the task, enable editing of the task functionality and/or provide another mechanism for adding the task to the actionable task structure.

During use, the task control interface 300A and/or other components of the data management software/platform system will identify a set of one or more suggested tasks from the transform dictionary 430 based on correlations between task attributes in the transform dictionary with the data set attributes and/or the textual input parsed from the annotation field (e.g., semantic or syntactic terms matching the parsed input).

When more tasks are identified than can be displayed, the task control interface 300A will filter the list to render a subset of the suggested tasks. The listing of selectable tasks in task suggestion field 330 may be filtered and/or ordered based on an alphabetical ordering, by frequency of use, level of attribute correlation (between tasks and data and/or user input), by computational expense (e.g., the quantity of records that will be changed in the data set if the task is implemented), and/or by a logical ordering determined by the task control UI, such as based on a sequential dependency defined by order of operation rules or other predetermined rules that are referenced by the task control UI 300A.

Once a user selects tasks from the suggested tasks, those selected tasks will be added to the actionable task structure 310 in the order they are selected and/or as otherwise designated by the user input (e.g., drag and drop). When the first task is selected, and no other tasks already exist in the actionable task structure 310 (e.g., for editing), that first selected task will be the first task added to the actionable task structure 310. Then, every time a new suggested task is selected, it will be appended to the actionable task structure 310 and the actionable task structure 310 will be saved (either automatically in response to the addition of the task or in response to other explicit user input). As each task is added, the actionable task structure will be saved as an appended/updated actionable task structure 310 with the newly selected task(s).

FIG. 4D illustrates an example of an actionable task structure 450 which has been saved as a discrete assembled data structure (corresponding to Task 1 (311), Task 2 (312), and Task 3 (313)) from the actionable task structure 310. As shown, this actionable task structure 450 is configured with different fields for storing the correspondingly relevant effect, input, output, code, dependency and/or priority information of the related tasks, which was obtained from the transformation dictionary 430.

In some embodiments, the task control UI 300A is also configured with controls that are operable (when selected) for controlling the application of the tasks in the actionable task structure to one or more data sets (including the identified data set and/or data sets in other domains when the actionable task structure is invoked in another domain). For instance, the task control UI 300A includes an 'apply all' control 341 that is operable, when selected, to initiate execution of each task in sequence from the actionable task structure 310.

Alternatively, or additionally, the task control user interface tool 300A includes an 'apply selected' control 342 that is operable, when selected, to execute only tasks that have been selected from the actionable task structure 310 (e.g., with selection controls 350) in the actionable task structure 310 by the user. For instance, task 1 has been selected for controlled execution.

Different controls, such as 'apply priority tasks' control 343 can also be provided to enable selective control over which priority level tasks are executed (E.g., priority 1 tasks, priority 2 tasks, etc.). When the 'apply priority tasks' control 343 is selected, an interface option for selecting the priority level of tasks to be executed is surfaced for user selection. Each task may also have a priority setting 360 that is visible to or hidden from the user. When the apply priority tasks control 343 is selected and a corresponding priority is designated (automatically or in response to further input), then execution of the corresponding tasks having the designated priority will be executed.

In alternative embodiments, the tasks may also be selected by clicking on the task and a color or visual identifier may be changed to reflect that the task has been selected for execution (e.g., to be executed when the 'apply all' control 341, 'apply selected' control 342 or 'apply priority tasks' control 343 is subsequently selected).

When the tasks are executed (individually or collectively as part of the actionable task structure), a visualization of the transformed data will be updated and reflected to the user. In some instances, the visualization is presented in a same or different window than the task control UI 300A. In one embodiment, the visualization is a small thumbnail representation, such as shown in the charts 101, 102 and 103 of FIG. 2A.

Figure 3B:
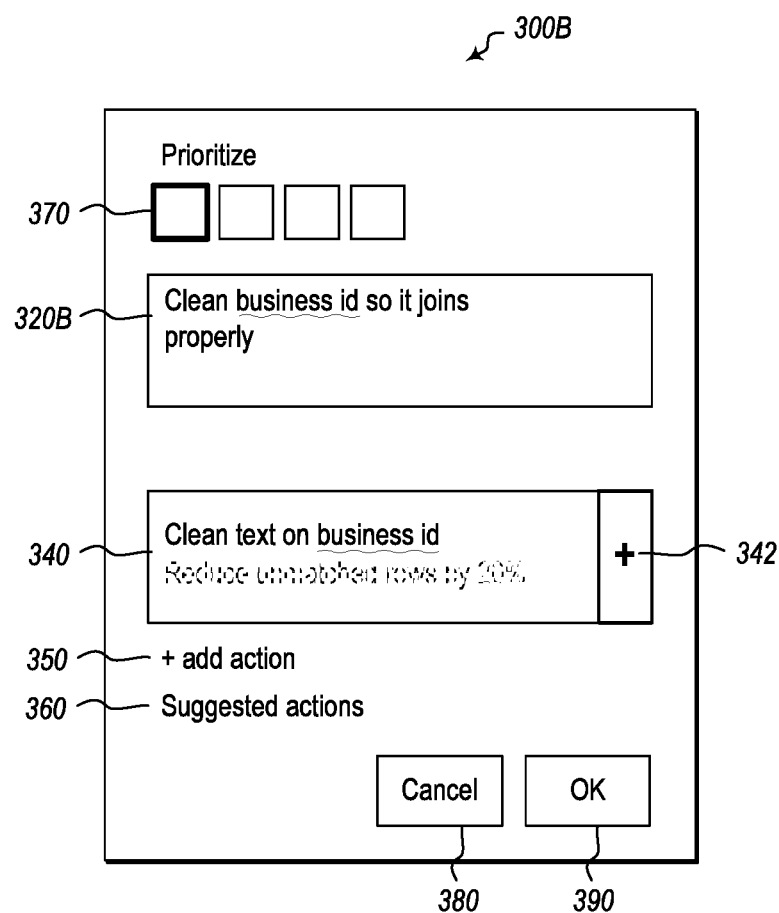
FIG. 3B illustrates another user interface that includes controls for setting priority of tasks, for editing a task and for adding a task to an actionable task structure assembly.

Attention will now be directed to FIG. 3B, which provides a user interface 300B that may be triggered for display separately from the task control UI 300A in FIG. 3A or that may be a supplementary user interface that is presented concurrently with the task control UI 300A (such as, for example, in response to a user selecting one of the selectable tasks from task suggestion field 330 or actionable task structure 310). The user interface 300B may also comprise a part of the task control UI 300A in some instances.

In some embodiments, the task control UI 300B is surfaced (displayed) in response to identifying a task that correlates with one or more key terms added to the annotation field 320 (dynamically in response to entry of the key terms). Selection of an icon (not shown) or a menu option (not shown) will also trigger, in some instances, a display of the task control UI 300B.

Task control UI 300B includes an annotation field 320B, which may include/mirror the text from annotation field 300A. Accordingly, this annotation field 320B includes text corresponding to an action the user would like to take on the identified data set.

The selected task from task control UI 300A is presented in a corresponding task field 340 of the task control UI 300B (e.g., by presenting selectable task A 331 if the selection of task A 331 triggered the display of task control UI 300B). If the user has not yet selected a task from the suggested task field 330, the task field 340 will present a new suggested task that is based on the context of the user text and/or the data in the data set, as generally referenced above, based on correlations between the different data set and task attribute sets and textual input.

The suggested task is sometimes presented within the task field 340 with additional information that describes one or more effects or results that are associated with the task, such as, for example (in this instance), the quantity of rows that will be effected by applying the task/data transformation operation on the data set (e.g., 'reduce unmatched rows by 20%'). It will be appreciated that other effects will correspond to different tasks and/or data sets. In some instances, the text for the effects can be obtained from metadata stored with the indexed transformations and/or from performing a background/sandbox implementation of the transform to dynamically ascertain the particular impact any task will have on a particular data set once the task is identified and/or selected by a user.

A visual indicator 342 is also provided, which is operable, when selected, by the user to add the suggested task 340 to the actionable task structure (e.g., actionable task structure 330A).

Task control 300B also includes additional controls, such as the '+ add action' control 350, the suggested actions control 360, priority controls 370, and controls to cancel (380) or OK (390) settings defined by the task control 300B.

The '+ add action' control 350 is operable, when selected, to add a new task to the task field 340, such as a next suggested task from the task suggestion field 330 and/or to add a new task operation to a defined task in the task field 340. For instance, selection of the '+ add action' control 350 may generate a list of one or more selectable add on operations that are capable of being merged with the task in the task field 340 and/or for editing the stored task attributes for that task.

The 'suggested actions' control 360 is operable, when selected, to cause a display of the task suggestion field 330 and/or to update the task suggestion field 330.

The priority controls 370 present selectable controls that are operable, when selected, to assign priorities to the tasks displayed in the task field 340. Each of the boxes in the prioritizing controls 370 correspond to a different color and priority level. For instance, red tasks may indicate high priority tasks, whereas orange tasks are less of a priority than the red tasks and yellow tasks are less of a priority than orange tasks. Any number of colors and task priority levels may be represented, so long as they differentiate from other levels in the controls. When a user selects a particular box/priority from the priority controls 350, the corresponding task (e.g., the task in task field 340) will be assigned the corresponding priority). The priority assignments are referenced, in some instances, by the task control UI 300A for sorting the tasks that are presented in the actionable task structure (e.g., actionable task structure 310) and/or for enabling filtered operation of the tasks by particular priority.

As an alternative embodiment, the priority controls 370 can include a numerical ranking, a high-medium-low determination, or other means for indicating priority instead of a color coding sequence. Alternatively, or additionally, the priority controls 370 may indicate a classification for the identified task. The classification can be based on user provided key words, color coding, or other indicator of similarity. For example, tasks correlated to normalizing data may be indicated with a color blue and tasks correlated to concatenating, or combining fields in a data set are indicated with a color orange. The categories displayed in the category field 350 may be user indicated and/or associated to the task itself by default.

Figure 5:
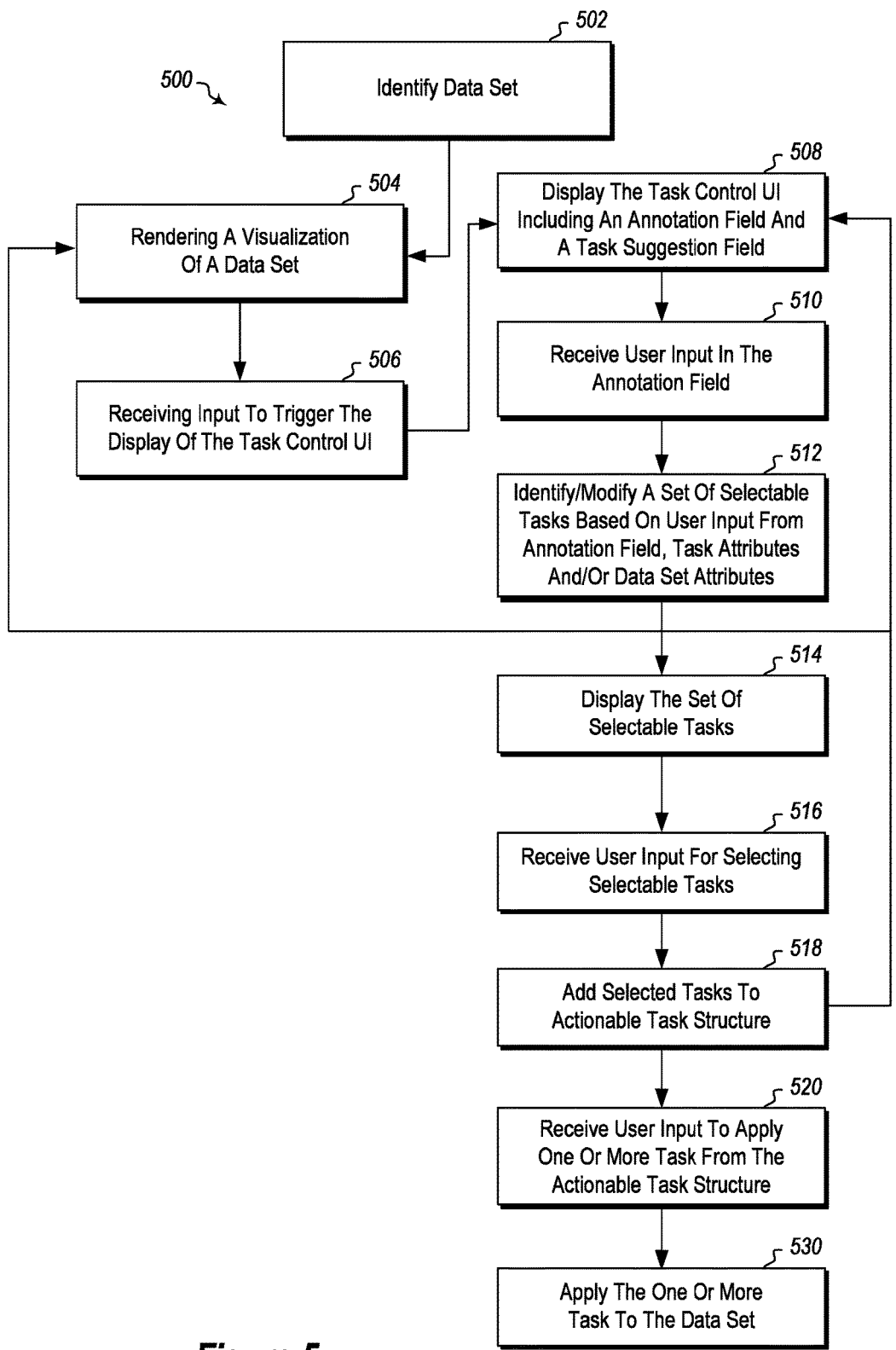
FIG. 5 shows a flowchart of a method for generating an actionable task structure comprised of a plurality of individually sequenced data transforms in the form of tasks.

Attention will now be directed to FIG. 5, which illustrates a flowchart 500 of acts associated with computer implemented methods for generating or providing an actionable task structure.

As illustrated, the disclosed methods include acts of identifying a data set 502 for which one or more visualizations will be provided and which will be used as a basis, at least in part, for identifying tasks to be assembled into an actionable task structure. The process of identifying the data set 502 can include any known technique for selecting or identifying data, particularly from a data management software platform. In some instances, this may include entering a file name or selecting a region of a table, for example.

Next, one or more visualizations associated with a data set (act 504) is rendered. As an example, a Sankey diagram 100 is rendered to visualize two tables comprising data sets that are being combined. Alternative visualizations include, but are not limited to examples represented in FIGS. 1A, 1B, 2A, and/or 2B.

Input is also received, which is operable to trigger a display of a task control UI 300 (act 506). This input can be a selection from a menu on a data management application or any other input that is operable to trigger the task control UI 300A, including selection of particular data or visualizations associated with the data set. By way of example, input can be received from a user where the user double-clicks or right-clicks a data item in a chart to identify possible actions to take on that data item. As another example, a user might right-click on the first data stream 130 (i.e. rows not combined in data set A) to trigger a display of a menu that has an option for launching the task control UI.

Other inputs could be gestures, gaze detection, speech recognition commands, typed executable commands, etc.

The disclosed methods also include displaying a task control user interface tool, such as task control UI 300A and/or interface 300B (act 508). The task control user interface may include an annotation field configured to receive textual input from a user, as described above. The task control user interface tool also includes a task suggestion field that displays a set of selectable tasks that are available for user selection.

Identification of the tasks in the task suggestion field is based at least in part on the context of the data set and/or input provided in the annotation field, as described above, such as based on correlations between the attributes in the data set attribute index 420 and/or task attributes identified in the transform dictionary.

In some instances, the identification of suggested tasks may also be based, at least in part on a correlation between the task attributes and terms identified in the key term index 410 that match terms extracted during parsing of the textual input entered into the annotation field 320 (act 510). Additionally, the step of identifying the suggest tasks may include filtering or otherwise modifying an initial set of suggested and selectable tasks based on the input from the user in the annotation field. (act 512). For example, based on the textual input entered into the annotation field 320 (act 510), and the semantic or syntactic terms that are parsed from that input, the system may update an existing set of tasks in the task suggestion field, to provide new tasks, remove tasks or change an ordering of the tasks so that the suggested tasks in the list are more contextually relevant (e.g., the new tasks have attributes with a stronger correlation to the new textual input than the task attributes of the previously listed tasks).

After displaying the set of identified and suggested tasks (act 514), or at least selectable links/identifiers to the tasks, some embodiments further include receiving user input that is operable for selecting one more tasks in the set of selectable tasks (act 516). This input can include any type of selection input, including a click and drag input. The selected tasks are then added to the actionable tasks structure (act 518). For example, when the user selects Task A 331 from the set of suggested tasks in the task suggestion field 330, that task would then be added to the actionable task structure 310 of the task control user interface. The user can click and drag the task to the actionable task structure or simply select the task (e.g., double click on the task or provide another input at interface 300A or 300B for adding the task-as described above).

The process of adding the selected tasks to the actionable task structure also includes saving the actionable task structure in such a manner that it can be invoked and applied in one or more different domains (e.g., to different data sets or applied through different interfaces and/or with a different data management session). The act of saving the actionable task structure may include storing the actionable task structure separately from the transformation dictionary that includes a listing of all tasks available to a data management software platform. The stored actionable task structure may include any of the components shown in the actionable task structure 450 of FIG. 4D. This actionable task structure (which includes a plurality of discrete tasks that have been assembled through the task control UI 300A) will be saved with a single file name that represents the composite assembly, such that it can be invoked by reference through one or more interfaces and domains at a later time.

Some embodiments further include receiving input for applying one or more of the tasks from the actionable task structure (act 520), concurrently with the build/assembly process or at a later time. In some instances, the tasks from the actionable task structure to be executed and the sequence for executing those tasks are determined with the features and controls described above, including the priority settings 360, the listed ordering of the tasks, the selection controls 350, the apply all control 341, the apply selected control 342 and/or the apply priority tasks control 343.

By way of example, a selection control box 350 for task 1 might be checked by first user input and then a user might provide second user input for selecting the 'apply all' control 341, which might, in this instance trigger the execution of a data transformation operation associated with task 1 (which is currently associated with the task referenced in the interface 300B). The transformation code associated with task 1 in the transformation dictionary might, for instance, be code for normalizing text or for correcting textual errors in the identified data set (e.g., a column in the data set labelled business_id).

Some embodiments further include applying the one or more selected tasks to the data set (act 530). In this regard, it will be appreciated that the data transforms can be applied to the stored data, changing how the data is persistently represented. Alternatively, the data transforms can be applied to a model of the underlying data (e.g., a visualization of the data or a temporary representation of the data), without actually changing the underlying data. For example, when the computer environment is operating in a temporary environment and an instance of a data set is being manipulated by the actionable task list, the changes are initially made to the temporary environment, without persisting the changes to the underlying data.

As indicated above, some embodiments further include storing the actionable task structure so that the stored actionable task structure can be launched from a different interface in response to receiving new user input directed to the different interface. For example, a user may initially create the actionable task structure during an analysis of the data in a Sankey diagram visualization of the data set. Then, later, the user may be working from a new interface or visualization of the data set. Despite changing the representation of the data, the stored actionable task structure can be accessed and rendered by the user for further modification and/or implementation. The stored actionable task structure can be accessed by a selection of a menu object or a portion of the new data/visualization.

As described above, different context is used to identify the suggested tasks to be assembled into an actionable task structure and interfaces are also provided to reflect the suggested tasks for user selection, for generating the assembled actionable task structure and/or for applying the tasks of the actionable tasks structure.

In most of the instances described above, the context used to identify the suggested tasks is based on correlations between the data set attributes, the task attributes and the semantic/syntactic terms parsed from the annotation field. However, other forms of context can also be used, in some instances (in addition and/or in the alternative) to help find suggested tasks for the task suggestion field. Some of those additional forms of context will now be provided, as well as some examples for utilizing the context (attribute correlation) described above.

In one embodiment, a context used for identifying a suggested task is based on the particular data set/object selected by the user to trigger the display of the task control user interface. For example, if a user right-clicks on the first data stream 130 (i.e. the rows not combined in data set A), the context would be based on the context of attribute correlation between the data set attribute of unmatched combinations and task attributes for tasks related to data transformations that would increase the number of available combinations for data in that data set. As an example, a single company may be spelled in more than one way in different records of data set A 110 (e.g. Microsoft, MSFT, and MS), yet data set B 120 may only have one of these values. In this instance, if the user triggers the task control user interface by indicating their interest in the rows that were not combined, a context will be identified that is associated with finding ways to combine the rows, such as a context associated with merging or normalizing values for disparate names. Accordingly, a suggested task would be to identify all data records in data set A 110 with a value of "MS" and modify or replace those values to "Microsoft." Another suggested task would identify all data records in data set A 110 with a value of "MSFT" and modify those values to "Microsoft." In this regard, the context is very granular, to the specific types of company names and possible alternatives for normalizing the terms. Additionally, or alternatively, a suggested task would combine the last two examples as a single suggested task. In this sense, the context would be a format of the data, as a merged data field or separate data fields for company names.

As referenced above, the correlation matching can be based in part on the textual input from the user in the annotation field. As an example, one or more selectable tasks 331, 332, 333 would be suggested based on parsing the text of the annotation field and determining data transformation operations associated to the text from the annotation field. For example, a user may provide the textual input of "clean business_id so it joins properly". Based on parsing this text and determining related data transformation operations having similar key words in the transformation labels or metadata defined in the task attributes of the transformation dictionary, different tasks would be identified that have declarations in the effect term field to "clean text on business_id" or syntactically similar declarations, where the operation includes executable code to normalize values and/or fix typos in the "business_id" field of the data set. Any identified tasks would then be presented as one or more of the selectable tasks displayed for selection by the actionable task structure interface.

As an alternative example, a user provides textual input of "multiply the sales tax and MSRP values". Here, the terms sales tax and MSRP are used to identify corresponding fields in the data set and to identify formats and types of those fields as numbers. Then the system identifies transformations that are configured to perform a multiplication on numbers based in part on identifying transformations having labels or metadata associated with multiplication (a synonym for a keyword in the annotation field). Based on this analysis, the system may identify a suggested transformation for performing a task to "combine sales tax field and MSRP field by multiplying them."

As an alternative or additional embodiment, the context (attribute correlation) is based in part on a task already enqueued in the actionable task structure. For example, a suggested task might parse a string value into a separate address, city, state, and zip code fields based on pattern recognition of the data set. After the user selects this task, some of the zip code fields may be empty. Based on the context of knowing a city and state, a suggested task to look up the zip code based on the city and state could be a suggested task. The zip code lookup capability could be based on similar data in the data set with the same city and state. Alternatively, an external system can be queried to look up that information, for example, from a web service.

As an alternative example, after selecting a task for the actionable task list, to parse a string into discrete address fields, which includes a name field, the interface 300A might suggest a new task in the task suggestion field. The newly suggested task might be for normalizing names in the name field, based on the correlation of task attributes in the previously selected task for parsing the data into a set of fields that include names and attributes associated with the new task for normalizing names values.

The list of suggested tasks can also be based, at least in part, on the identification of outliers in the data set during the analysis of the data set. For instance, analysis of the data set may reveal misspellings, in the data set, based on a consultation of a dictionary or list of terms. For example, if the data set included a list of companies in data set B 120, the new task looks for misspellings of a company name, "Microsoft," based on a white list of company names or a search index of known companies. The search may also simply identify stand-alone terms that do not have any other matches in the data set or any related mappings by the storage system for the term/company. Then, the system can (based on this context, which includes a detected data set attribute of multiple variations of a common term in a particular data range) provide appropriate suggestions to fix the error, based on identifying tasks having attributes for consolidating terms that are presented in different formats. As an example, if one or more rows had a misspelling of "Micrsoft", the new task could suggest fixing this to a normalized value of "Microsoft".

In some embodiments, the detected context used to identify the suggested tasks is based in part based on the method and/or location used for receiving the user input that is operable to trigger the display of the task control user interface tool. For example, referring to FIG. 1, the suggested tasks would be different based on the user selecting the first stream 130 and the user selecting the rows from the third stream 150.

As an example and referring to the Sankey diagram 100 in FIG. 1A or FIG. 2A, the user could double-click on the first stream 130 and the system would present one or more tasks that can be taken to create more matches between the data set. The user could initiate this action in several ways including double-clicking, right-clicking, a press-and-hold, gaze detection, a menu option selection, etc. In some cases, the suggested tasks may be based on multiple factors, including any of the foregoing context factors or any other factors that determined to be associated with the data and the stored tasks.

By way of example, if a user is working from a Sankey diagram 100 that visually represents the number of rows that are successfully joined and not joined, a first factor may be whether there are anomalies that prevent the rows from being joined. A second factor could also be whether the user selected the first stream 130 that represents rows from data set A 110 that did not join with data set B 120. The system can analyze which data elements can be changed to reduce the data abnormalities. In this example, due to the context provided by the data being represented and the users input, the system may identify some corrective actions associated with improving the join, which may require a change to data in data set A or data set B, but may refrain from presenting any identified corrective actions that would require a change to the data in data set A 110, since the context of selecting data set A 110 shows a preference for data in data set A 110.

In some embodiments, the detected context comprises a detected type of data in the data set. For example, if the character format of a record looks similar to a number but is not formatted properly (e.g., being formatted as a textual character type, as detected by the data attribute analyzer, whereas the data type associated with the name value for the column of records indicates that values should be integers or wherein all other data entries are integers), a suggested task could be identified based on a correlation to a task attribute associated with a data transform for reformatting the data to the expected format/type. As an alternative example, if a data record expects a first and last name separately (based on tagged annotations for the data) and finds one of these fields null and the other field has a two-part name, for example "Mindy McConnell", the task could suggest separating the data entry with "Mindy" as the first name field and "McConnell" as the last name.

In some embodiments, the detected context is based in part on the location of the data in the data set. For example, if the fields first name and last name are located next to each other in a data set and a field delimiter, for example a pipe or semicolon, is missing so that the first name field is "Mindy McConnell" and the last name field is blank or null. Based on this context, the new task would suggest that the records should be spilt with "Mindy" as the first name and "McConnell" as the last name.

Some embodiments further include parsing the textual user input into parsed textual input and finding one or more tasks from a task repository that corresponds to the parsed text. For example, a user could provide "clean business_id so it joins" as the textual user input. In this example, terms would be parsed and associated to actions in a task repository (e.g., table or other data structure). In this example, the textual input could be associated to suggest an action to normalize the data field "business_id" based on the identified and parsed data field "business_id" and the terms "clean" and/or "join."

Some embodiments further include presenting at least two sequential tasks of the selectable tasks according to dependency restrictions that are associated with an intended sequential order of operation, as defined by transformation metadata or stored transformation rules. For example, a data field may need to be normalized first and then parsed or combined. For example, the values "Mrs.", "Ms.", "miss", may all be normalized to "Ms.". After the normalizing, the value can be converted to "female". Here, the sequence of tasks may be restricted, or required to be sequential and performed in a particular order. The combination of related or sequential tasks can also be referenced as a task subset by a single identifier in the task suggestion field 330, such that when the identifier is selected, all of the corresponding subsets of tasks are added to the actionable task structure.

It will be appreciated that all of the disclosed embodiments may be implemented with a computer system including one or more processors and computer-readable media such as computer memory that store computer-executable instructions that are operable, when executed by one or more processors, to cause various functions to be performed, such as the acts recited in the disclosed embodiments. Exemplary computing environments are further described below in reference to FIGS. 6 and 7.

Figure 6:
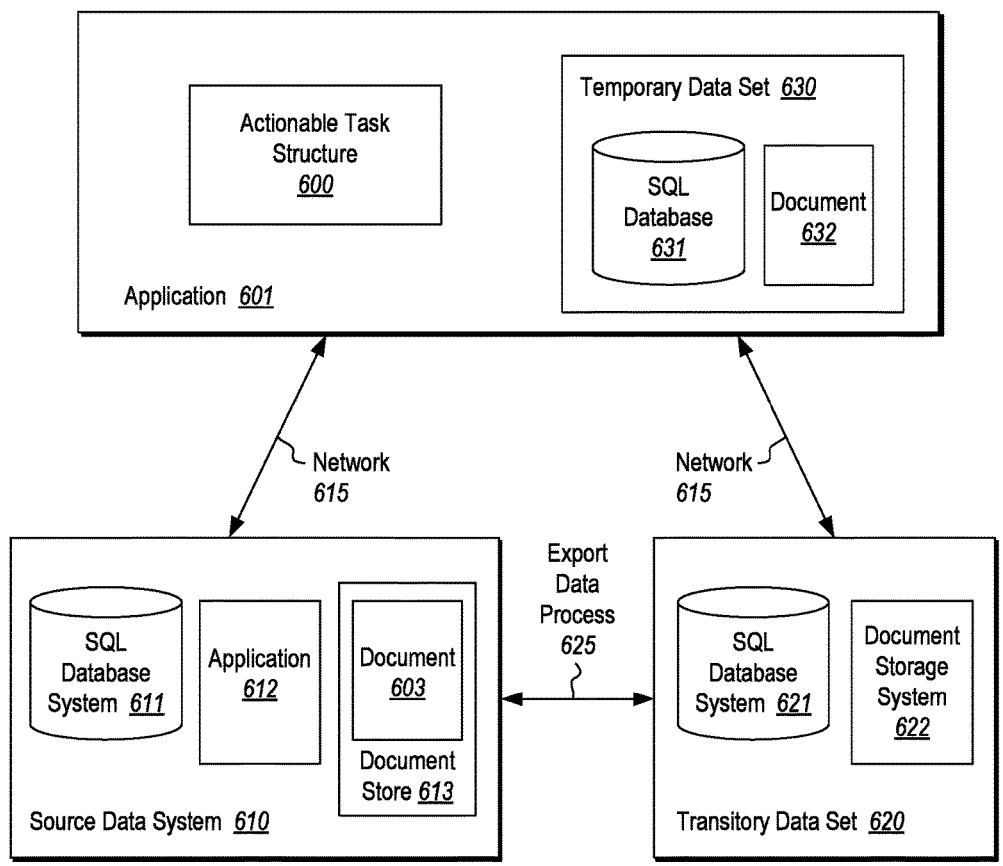
FIG. 6 shows an exemplary computing environment of different data sets that are transformable by an actionable task structure.

FIG. 6 provides an example of different types of data sets that may be used to generate and/or apply the actionable task structure 600. The actionable task structure 600 may be generated by and configured to be executed with data from a source system 610, a transitory data set 620, and/or a temporary data set 630. Data sets can be an entire database, a table in a database, an exported file from a database, a collection of documents or a single document in a document storage system, an XML list, data queried from a web service (e.g. a RESTful API), etc.

In one embodiment, the source system data 610 may be from a SQL database system 611, a data API and/or a computer application 612, and/or a document storage based system 613 comprising one or more files 603. The data transforms of the actionable task structure are capable of operating directly on these types of data sets over a network 615. For example, an actionable task structure may be able to analyze a repository of documents in a document storage based system 613 and transform the data within the documents based on the sequence of tasks. As an example, an address that is tagged as a single data element in the document can be transformed by parsing the address into street address, city, state, and zip code. In this example, the source document will be transformed to the new data format. As an alternate example, a SQL system may store the address as a single data value. In that case, an actionable task structure can execute the necessary database and data manipulation operations to transform the data from a single value to multiple values.

As an alternative embodiment, a transitory data set 620 may be the operable target of the actionable task structure. The transitory data set may exist in a process where data is moved from a first system to a second system. The transitory data set is used to manipulate the data over a network 615 so that is it ready for consumption in the second system. The second system could be a line of business application, a data warehouse, a report, or other system that uses data. In this example, data from one or more source system data 610 may be exported 625 to one or more data formats in the transitory data set 620. The transitory data sets could be a SQL system 621, a document storage system 622, and/or any other format to store data. In this embodiment, the actionable task structure is capable to conduct similar data transformation operations as the previous example.

As an alternative embodiment, the data may be transformed in a temporary data set 630 that is used in an application configured to execute the actionable task structure. In this case, the data may be imported from a source system 610, a transitory data set 620, or a combination of these. The temporary data set 630 may serve as a working copy of the data and the data may be temporarily stored and modified in a SQL database 631 or an unstructured data store, like a document storage system 632. The temporary data set could be used to calculate and model a predicted effect of the sequenced order list by executing the changes and identifying the effect. In this embodiment, the actionable task structure could conduct similar operations as the previous example.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Figure 7:
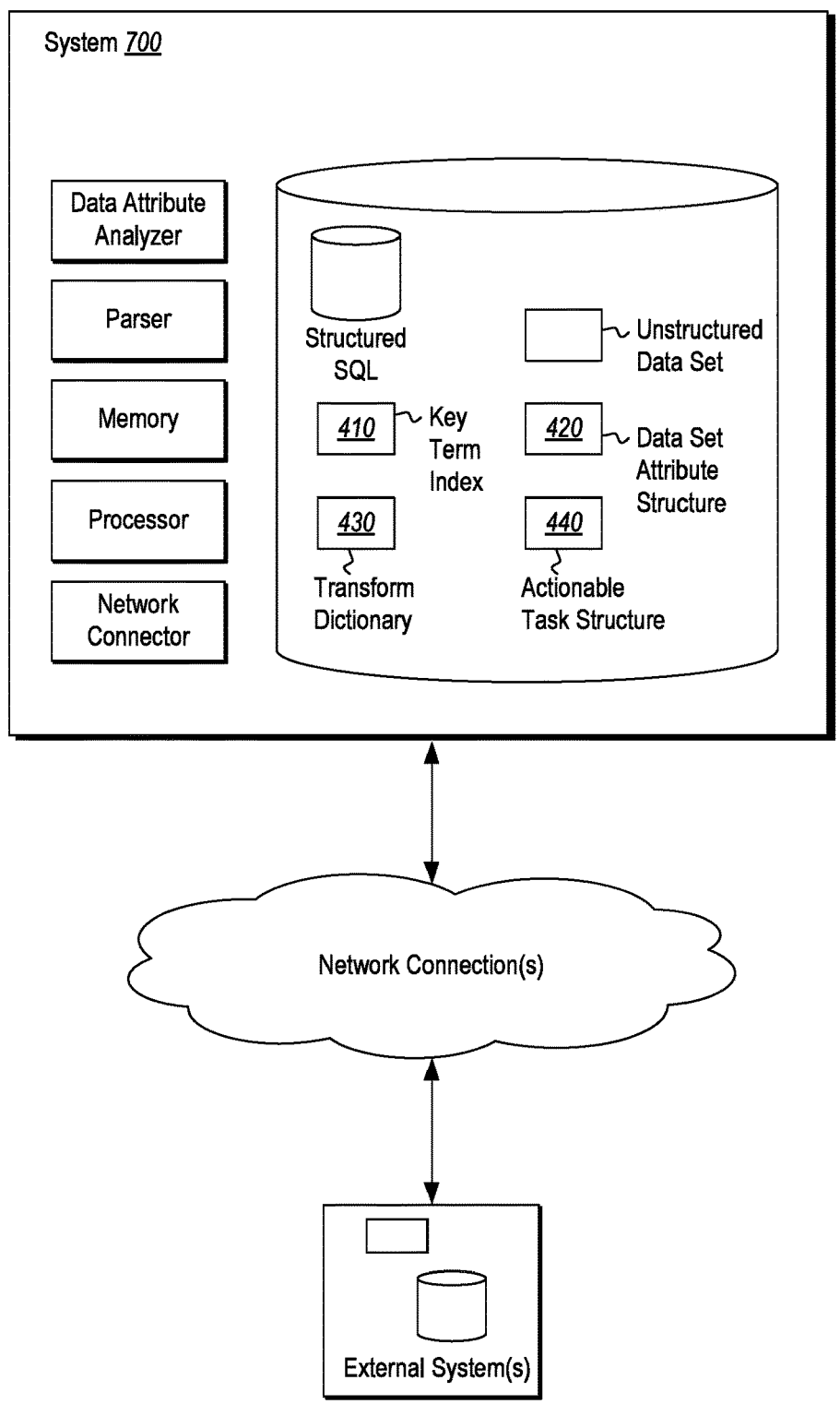
FIG. 7 shows an exemplary computing environment that includes system components which are operable to implement aspects of the disclosed embodiments.

FIG. 7 illustrates a representative computing system 700 for implementing the methods and functionality described above. As shown, the system 700 may include the actionable task structure 440 (which may be stored as executable instructions within the storage of the system). The storage may also store tables and other data structures described above, including the transform dictionary 430, the data set attribute structure 420, the key term index 410 and the structured and/or unstructured data that forms the identified data set, and the computer-executable instructions that are executed by processors of the system 700 to implement the functionality described herein.

The system also includes memory and network connectors that are configured to store, process and communicate the interfaces, actionable tasks structures, other data structures described herein, as well as to help execute the stored executable instructions for implementing the functionality described herein.

The system also includes the data attribute analyzer, described above, which is used to identify attributes of a particular data set and a parser that is used to identify semantic and syntactic terms associated with textual input entered into the annotation field of the disclosed interfaces.

In some instances, the system is a distributed system that is connected to one or more external systems that contain similar, shared and/or different components than those described above to implement the functionality described herein.

The system 700 may be embodied as a special purpose computer including input and output computer hardware, as well as hardware storage and processors, for implementing functionality of the claimed invention. Embodiments within the scope of the present invention may also include combinations of physical and other computer-readable media for carrying or storing computer-executable instructions and/or data structures that are executed by the processors of the system to implement the claimed invention. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processor; and
   one or more storage devices having stored computer-executable instructions which are executable by the one or more processor to cause the computing system to implement a method for generating an actionable task structure comprised of a plurality of tasks, wherein each of the plurality of tasks includes a transform for transforming data having one or more particular attributes, the method comprising:
   accessing a data set that includes data having the one or more particular attributes;

rendering one or more visualizations associated with the data set;

receiving user input for triggering a display of a task assembly structure user interface;

displaying the task assembly structure user interface, the task assembly structure user interface including:

an actionable task structure display, the actionable task structure display including a display of set of selected tasks and, for each displayed selected task, an add action control and a suggested actions control;

a selectable apply all control, a selectable apply selected control, and a selectable apply priority control;

an annotation field configured to receive textual user input; and a task suggestion field for displaying an identifier for each of a set of one or more suggested tasks that are selectable by user input for inclusion in the actionable task structure, wherein each suggested task includes a particular data transform and particular metadata that defines corresponding attributes of particular data that the particular data transform applies to;

receiving the textual user input in the annotation field;

identifying the set of one or more suggested tasks based at least in part on the one or more particular attributes of the data of the accessed data set, the particular metadata of each of the one or more suggested tasks, and the textual user input received in the annotation field;

displaying the identifiers for the identified one or more suggested tasks in the task suggestion field;

receiving input that selects one or more of the suggested tasks displayed in the task suggestion field;

displaying each of the selected tasks in the actionable task structure display;

adding each selected task to the actionable task structure; and storing the actionable task structure as an assembly of a plurality of selected tasks.

2. The computing system of claim 1, wherein the method further includes:

launching and applying the actionable task structure in a different domain than it was assembled in.

3. The computing system of claim 2, wherein launching and applying the actionable task structure in a different domain includes applying the actionable task structure to a new data set.

4. The computing system of claim 1, wherein the set of one or more suggested tasks is based in part on parsing the textual user input into parsed textual input and finding the at least one task from a task repository containing a key term in metadata corresponding to the parsed textual input.

5. The computing system of claim 1, wherein the set of one or more suggested tasks includes at least two tasks that are defined by a required sequential dependency.

6. The computing system of claim 1, wherein the set of one or more suggested tasks includes at least one suggested task that is identified by metadata defining a dependency that is associated with another task already included in the actionable task structure.

7. The computing system of claim 1, wherein the set of one or more suggested tasks includes at least one suggested task that is identified based on a method or location used for receiving the user input that is operable to trigger the display of task control user interface tool.

8. The computing system of claim 1, wherein the one or more particular attributes of the data used for identifying the set of one or more suggested tasks comprises a type of data in the data set.

9. The computing system of claim 1, wherein the one or more particular attributes of the data used for identifying the set of one or more suggested tasks comprises a detected location of data in the data set.

10. The computing system of claim 1, wherein the one or more particular attributes of the data used for identifying the set of one or more suggested tasks comprises a formatting of data in the data set.

11. The computing system of claim 1, wherein at least one of the identifiers corresponds to a previously stored actionable task structure comprising a plurality of tasks and that, when selected, causes the previously stored actionable task structure to form a subassembly of the actionable task structure.

12. The computing system of claim 1, wherein the task assembly structure user interface further includes:

a display of the actionable task structure showing identifiers for each task in the actionable task structure.

13. The computing system of claim 12, wherein the task assembly structure user interface further includes:

one or more selectable controls for selecting and applying one or more particular tasks from the actionable task structure to the data set;

receiving user input at the one or more selectable controls; and applying the one or more selected particular tasks to the data set based on the user input received at the one or more selectable controls.

14. The computing system of claim 1, wherein the method further includes applying the one or more selected particular tasks to the data set.

15. The computing system of claim 14, wherein application of the one or more selected particular tasks to the data set occurs by modifying a model of underlying data of the data set rather than changing the underlying data where the underlying data is stored.

16. The computing system of claim 14, wherein the method further includes updating the one or more visualizations as part of applying the one or more selected particular tasks to the data set.

17. The computing system of claim 1, wherein the identifiers comprise a selectable label which, when selected, triggers the display of a new task interface comprising:

a selectable control which, when selected, adds the selected task to the actionable task structure; and one or more selectable options which, when selected, designate a priority of the selected task.

18. A computer-implemented method for generating an actionable task structure comprised of a plurality of tasks, wherein each of the plurality of tasks includes a transform for transforming data having one or more particular attributes, the method comprising:

accessing a data set that includes data having the one or more particular attributes;

rendering one or more visualizations associated with the data set;

receiving user input for triggering a display of a task assembly structure user interface;

displaying the task assembly structure user interface, the task assembly structure user interface including:

an actionable task structure display, the actionable task structure display including a display of set of selected tasks and, for each displayed selected task, an add action control and a suggested actions control;

a selectable apply all control, a selectable apply selected control, and a selectable apply priority control;

an annotation field configured to receive textual user input; and a task suggestion field for displaying an identifier for each of a set of one or more suggested tasks that are selectable by user input for inclusion in the actionable task structure, wherein each suggested task includes a particular data transform and particular metadata that defines corresponding attributes of particular data that the particular data transform applies to;

receiving the textual user input in the annotation field;

identifying the set of one or more suggested tasks based at least in part on the one or more particular attributes of the data of the accessed data set, the particular metadata of each of the one or more suggested tasks, and the textual user input received in the annotation field;

displaying the identifiers for the identified one or more suggested tasks in the task suggestion field;

receiving input that selects one or more of the suggested tasks displayed in the task suggestion field;

displaying each of the selected tasks in the actionable task structure display;

adding each selected task to the actionable task structure; and storing the actionable task structure as an assembly of a plurality of selected tasks.

19. A computer program product comprising one or more hardware storage devices having stored thereon computer-executable instructions that are executable by one or more computer processor of a computing system to cause the computing system to implement a method for generating an actionable task structure comprised of a plurality of tasks, wherein each of the plurality of tasks includes a transform for transforming data having one or more particular attributes, the method comprising:

accessing a data set that includes data having the one or more particular attributes;

rendering one or more visualizations associated with the data set;

receiving user input for triggering a display of a task assembly structure user interface;

displaying the task assembly structure user interface, the task assembly structure user interface including:

an actionable task structure display, the actionable task structure display including a display of set of selected tasks and, for each displayed selected task, an add action control and a suggested actions control;

a selectable apply all control, a selectable apply selected control, and a selectable apply priority control;

an annotation field configured to receive textual user input; and a task suggestion field for displaying an identifier for each of a set of one or more suggested tasks that are selectable by user input for inclusion in the actionable task structure, wherein each suggested task includes a particular data transform and particular metadata that defines corresponding attributes of particular data that the particular data transform applies to;

receiving the textual user input in the annotation field;

identifying the set of one or more suggested tasks based at least in part on the one or more particular attributes of the data of the accessed data set, the particular metadata of each of the one or more suggested tasks, and the textual user input received in the annotation field;

displaying the identifiers for the identified one or more suggested tasks in the task suggestion field;

receiving input that selects one or more of the suggested tasks displayed in the task suggestion field;

displaying each of the selected tasks in the actionable task structure display;

adding each selected task to the actionable task structure; and storing the actionable task structure.

* * * * *